United States Patent
Xu et al.

(10) Patent No.: US 12,389,274 B2
(45) Date of Patent: Aug. 12, 2025

(54) ALLEVIATING CELL CONGESTION IN WIRELESS NETWORKS

(71) Applicant: Microsoft Technology Licensing, LLC, Redmond, WA (US)

(72) Inventors: Huimin Xu, Lexington, MA (US); Charles Crisler, Windham, NH (US); John Elias Maroun, Marlborough, MA (US); Kaykhosrow Jahanian Parsi, Reading, MA (US); Michael Perron, Millbury, MA (US); Piotr Galecki, Lexington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 488 days.

(21) Appl. No.: 17/834,349

(22) Filed: Jun. 7, 2022

(65) Prior Publication Data
US 2023/0397047 A1    Dec. 7, 2023

(51) Int. Cl.
*H04W 28/086*   (2023.01)
*H04W 28/02*    (2009.01)

(52) U.S. Cl.
CPC ..... *H04W 28/086* (2023.05); *H04W 28/0289* (2013.01)

(58) Field of Classification Search
CPC ............ H04W 28/0284; H04W 28/10; H04W 28/0289; H04L 45/38; H04L 47/22; H04L 47/12
See application file for complete search history.

(56) References Cited

U.S. PATENT DOCUMENTS

| | | |
|---|---|---|
| 8,565,080 B2 | 10/2013 | Kavanaugh et al. |
| 10,051,512 B2 | 8/2018 | Jeong et al. |

(Continued)

FOREIGN PATENT DOCUMENTS

| | | |
|---|---|---|
| EP | 2784991 A1 | 10/2014 |
| WO | 2021155929 A1 | 8/2021 |

OTHER PUBLICATIONS

"International Search Report and Written Opinion Issued in PCT Application No. PCT/US23/018788", Mailed Date: Jul. 17, 2023, 17 Pages.

(Continued)

*Primary Examiner* — Yee F Lam

(57) ABSTRACT

Systems and methods are provided for alleviating congestion of data traffic in a wireless network in a cell site. The methods determine congestion levels for respective data connections from mobile computing devices to a network through a cell tower in a cell site. The method further determines a congestion level associated with the cell site based on a weighted aggregate of varying congestion levels associated with the respective data connections in the cell site. The disclosed technology includes flow policies associated with congestion levels. The flow policies determine weights used for determining the weighted aggregate and maximum network bandwidth enforced for the respective data connections. The disclosed technology identifies data connections that consume abnormally high amount of network bandwidth and throttles with bias against data traffic associated with these data connections with heavy traffic. Through dynamically updating traffic shaping with bias, the present disclosure alleviates congestion in the cell site.

20 Claims, 9 Drawing Sheets

(56) References Cited

U.S. PATENT DOCUMENTS

| | | |
|---|---|---|
| 10,362,507 B2 | 7/2019 | Dao |
| 10,873,533 B1 | 12/2020 | Ismailsheriff et al. |
| 2004/0264377 A1* | 12/2004 | Kilkki ............... H04L 47/10 370/235 |
| 2011/0170412 A1* | 7/2011 | Ramadas ............ H04W 4/24 370/235 |
| 2012/0140624 A1* | 6/2012 | Denman ............. H04L 47/22 370/230.1 |
| 2012/0195324 A1* | 8/2012 | Raghuraman ....... H04L 47/00 370/431 |
| 2013/0051226 A1* | 2/2013 | Elefant ............... H04W 72/56 370/230 |
| 2015/0016266 A1* | 1/2015 | Dumitrescu ......... H04L 47/20 370/236 |
| 2016/0191406 A1* | 6/2016 | Xiao ................. H04L 12/6418 370/235 |
| 2016/0261510 A1 | 9/2016 | Burnette et al. |
| 2017/0353877 A1 | 12/2017 | Kulkarni et al. |
| 2021/0014144 A1 | 1/2021 | Wai et al. |
| 2022/0046466 A1* | 2/2022 | Sridhar .............. H04W 28/02 |

OTHER PUBLICATIONS

Cangialosi, et al., "Site-to-Site Internet Traffic Control", In Repository of arXiv:2011.01258v3, Apr. 26, 2021, 16 Pages.

\* cited by examiner

300A

Flow Data 302

| Session ID 304 | Conn. ID 306 | Peak Thruput 308 | Time Duration 310 | Avg. Thruput 312 | Congestion Level 314 | Cell Site ID 316 |
|---|---|---|---|---|---|---|
| 001 | 002 | 95 | 10 | 32 | SEVERE | 101 |

Congestion Level Definition for Cell Site 320

| Severity Level 322 | Weight for Aggregating Sessions 326 | Minimum Congestion Percent for Cell Site 328 |
|---|---|---|
| NONE | 0 | 0 |
| MILD | 1 | 20 |
| MODERATE | 2 | 30 |
| SEVERE | 4 | 50 |

Determining A Congestion Level 330:
Congestion Percent = <Total weighted subscribers in a cell site> / <The maximum weights of all subscribers in the cell site>

Example:   10,000 subscribers in a cell site;
1000 subscribers under SEVERE; 2000 subscribers under MODERATE; 3000 subscribers in MILD in a cell site
Total weighted subscribers in the cell site: 1000(SEVERE) x 4 + 2000 (MODERATE) x 2 + 3000 (MILD) x 1 = 11,000
Maximum weighted value in the cell site: 10,000 (Total) x 4 = 40,000
Congestion Percent = 11,000 / 40,000 = 28%

Current Level = MILD LEVEL:  MODERATE(30) > 28 >MILD (20);

FIG. 3C

Cell Site Congestions 350

| Cell Site ID 352 | Number of Sessions at Congestion Levels in the Cell Site 353: | | | |
|---|---|---|---|---|
| | NONE 354 | MILD 355 | MODERATE 356 | SEVERE 357 |
| 099 | 399 | 95 | 1211 | 1968 |

Cell Site Congestion Level 358

SEVERE

FIG. 3D

Flow Policy Definition 364

| Severity Level of Session 366 | Maximum Throughput 368 (for session, Mbps) |
|---|---|
| NONE | 500 |
| MILD | 250 |
| MODERATE | 100 |
| SEVERE | 50 |

FIG. 3E

Cell Sites and Congestion Levels 370

| Cell Site ID 372 | Chassis 374 | Number of Sessions at Congestion Levels 376 | | | | Cell Site Congestion Level 386 |
|---|---|---|---|---|---|---|
| | | NONE 378 | MILD 380 | MODERATE 382 | SEVERE 384 | |
| 001 | 67 | 100 | 10 | 0 | 0 | MILD |
| 060 | 67 | 200 | 0 | 0 | 0 | NONE |
| 099 | 67 | 399 | 95 | 1211 | 1968 | SEVERE |

| Cell Site Conditions 402A (at initial time) | | | | |
|---|---|---|---|---|
| Cell Site Congestion Level 404A: | SEVERE | | | |
| Cell Site ID 404A | Session ID 406A | Conn. ID 408A | Session Congestion Level 410A | Flow Policy Enforced? 412A |
| 099 | 001 | 001 | SEVERE | YES |
| 099 | 002 | 001 | SEVERE | YES |
| 099 | 003 | 001 | NONE | NO ← 420A |

| Cell Site Conditions 402B (at one time cycle) | | | | |
|---|---|---|---|---|
| Cell Site Congestion Level 404B: | SEVERE | | | |
| Cell Site ID 404B | Session ID 406B | Conn. ID 408B | Session Congestion Level 410B | Flow Policy Applied? 412B |
| 099 | 001 | 001 | SEVERE | YES |
| 099 | 002 | 001 | SEVERE | YES |
| 099 | 003 | 001 | NONE | YES ← 420B |

FIG. 4B

ALLEVIATING CELL CONGESTION IN WIRELESS NETWORKS

BACKGROUND

As use of smartphones and other mobile computing devices has become common place in our daily lives, the speed of cellular networks has become important to users of the mobile computing devices. Some applications, email or SMS applications, for example, exchange limited amounts of data and have little impact on a network, while other applications, video chat apps or streaming applications, for example, exchange large amounts of data and consume significant network bandwidth.

Much of the congestion in a wireless network may be caused by congestion occurring at a few cell sites. A cell site may refer to the antenna equipment used to transmit and receive cell phone signals. In aspects, multiple cell sites may be attached to a single cell tower, which is a physical structure at a geographic location. Because cell towers (and, accordingly, cell sites) are geographically distributed, congestion is also geographically localized and concentrated at places where and at times when people tend to gather. For example, congestion may occur during a football game at a football stadium in geographic proximity to a cell site or during rush hour at a busy railroad, subway, or light rail station.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for alleviating cell congestion in wireless networks. The system determines a consumption level of a data session associated with a first device wirelessly connected to a cell site. The system further determines a consumption level of another data session associated with a second device wirelessly connected to the cell site. By aggregating the subscriber sessions connected to the cell site and weighting the sessions based on a congestion level, the system determines an overall cell congestion level of the cell site. The system further determines flow policies associated with the cell site and enforces maximum network bandwidth for the respective subscriber sessions in the cell site. By enforcing the policies, the system prevents individual data sessions from consuming a disproportionately high amount of the available bandwidth, particularly during periods of high congestion. The system periodically updates congestion levels of the respective data sessions and the cell site. Accordingly, the system dynamically reduces cell congestion at the cell-site level.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 3A-F illustrate example data structures associated with sessions, congestion levels, and flow policies in accordance with aspects of the present disclosure.

FIGS. 4A-B illustrate an example data structures in accordance with aspects of the present disclosure.

Figure 5:
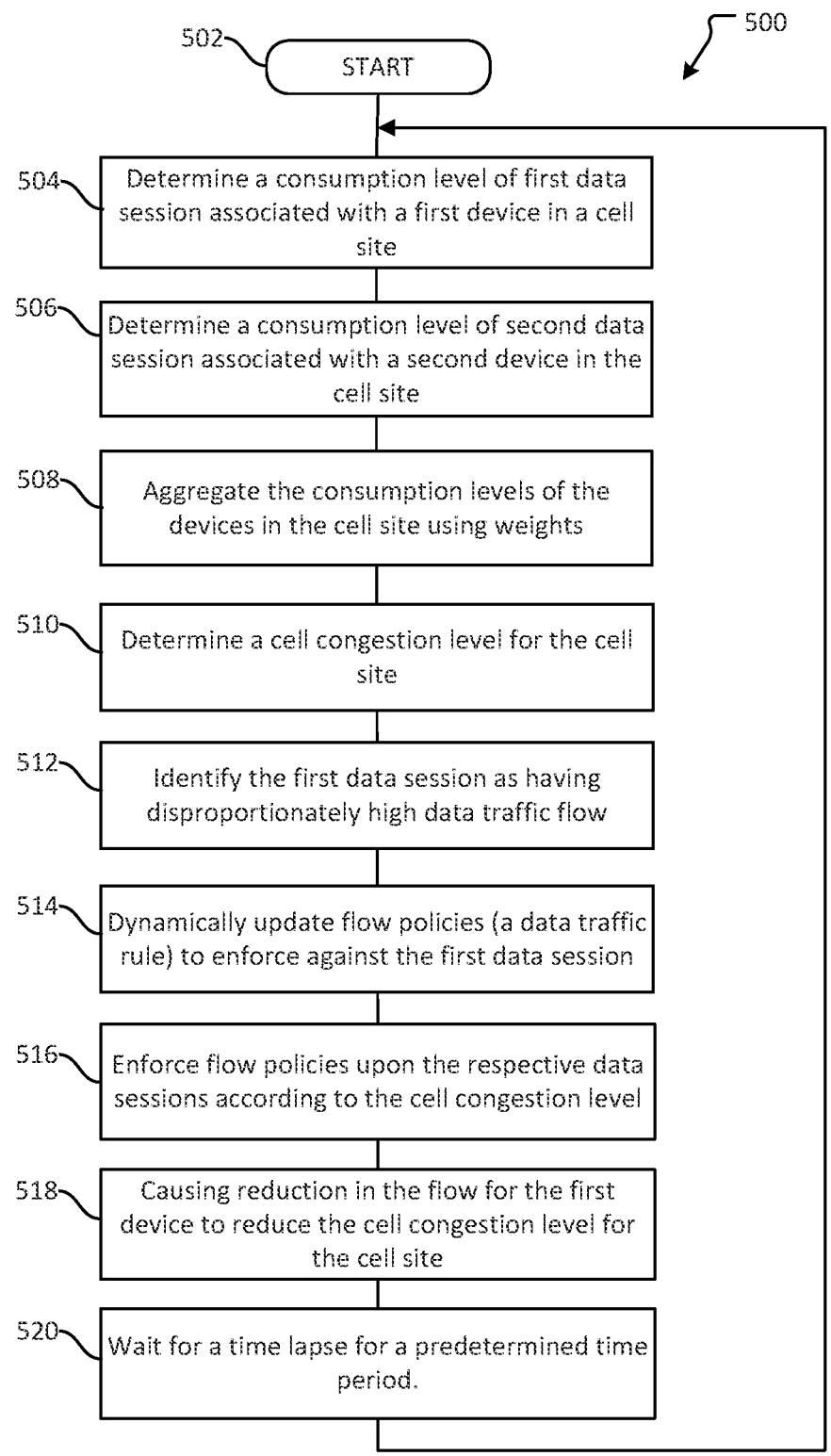

FIG. 5 illustrates an example of a method for determining and enforcing a flow policy for data traffic in accordance with aspects of the present disclosure.

Figure 6:
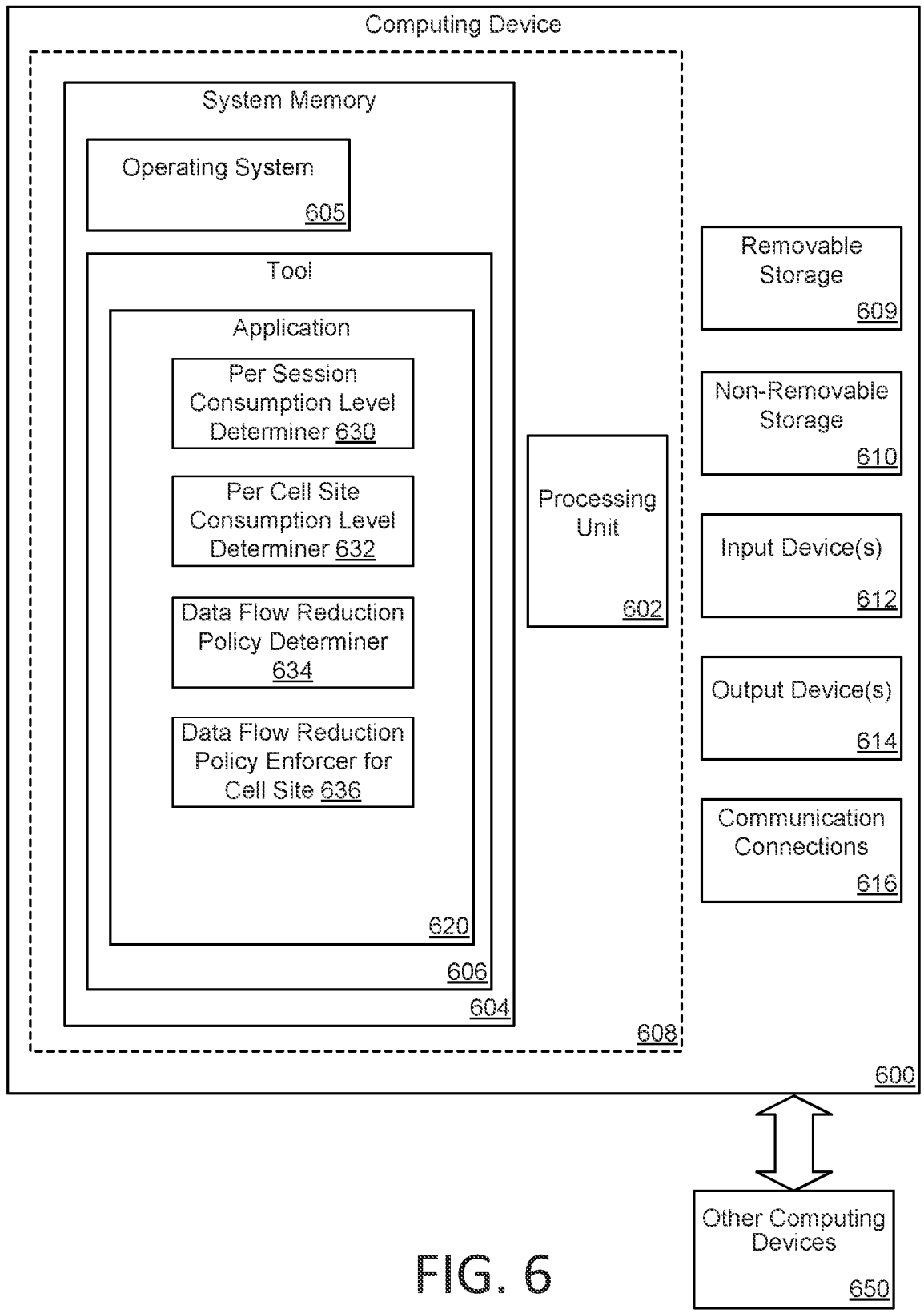

FIG. 6 is a block diagram illustrating example physical components of a computing device with which aspects of the disclosure may be practiced.

Figure 7A:
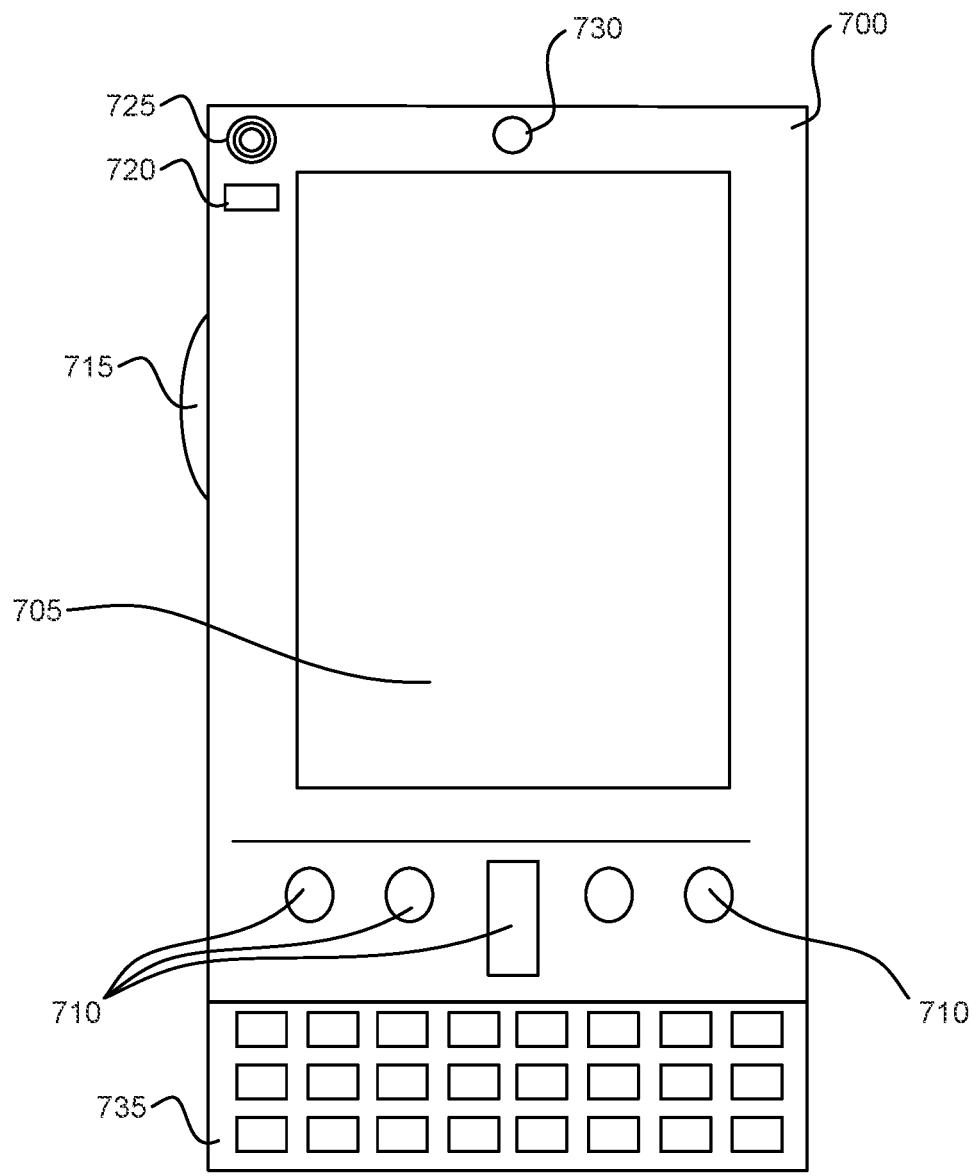

FIG. 7A is a simplified diagram of a mobile computing device with which aspects of the present disclosure may be practiced.

Figure 7B:
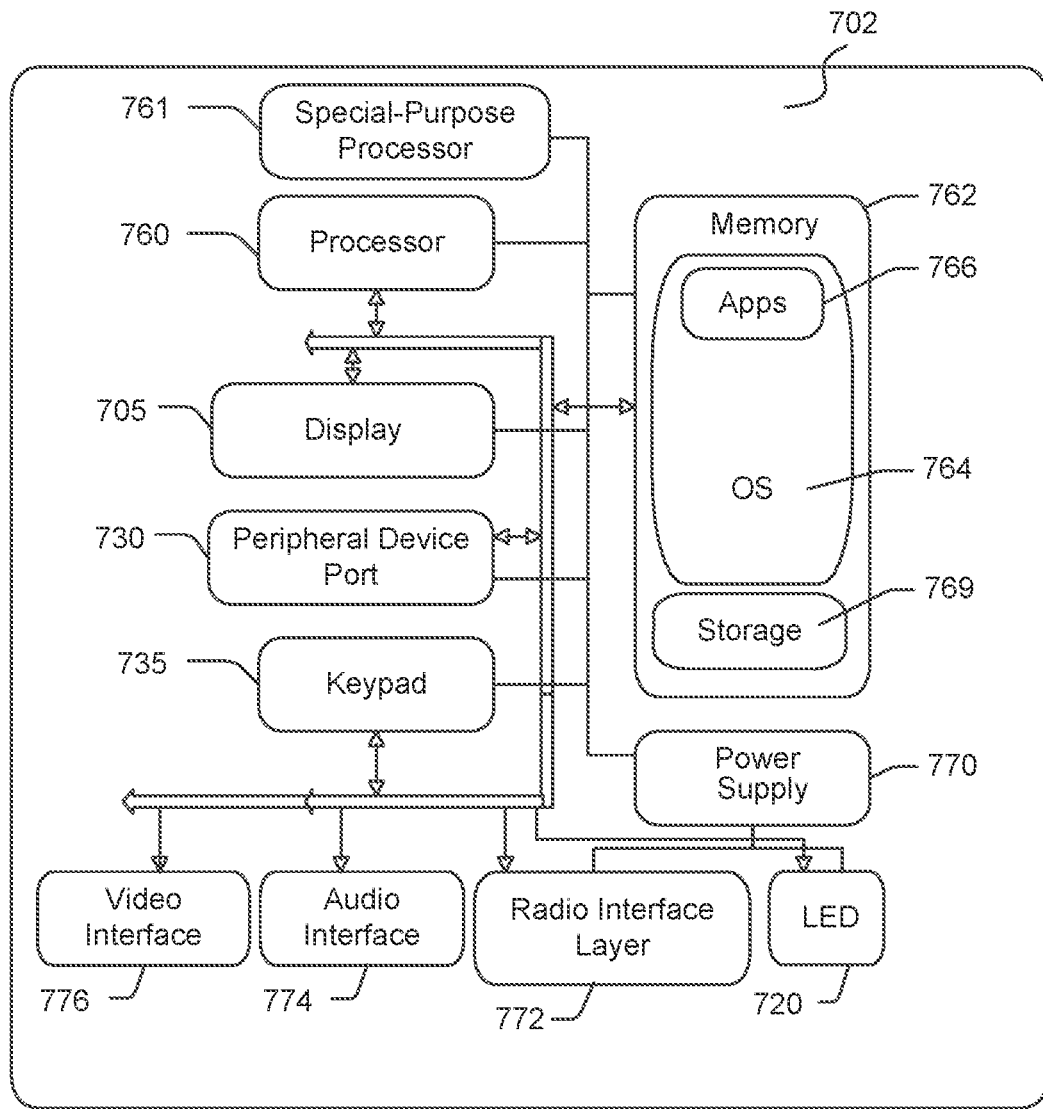

FIG. 7B is another simplified block diagram of a mobile computing device with which aspects of the present disclosure may be practiced.

DETAILED DESCRIPTION

Demand for integration between a cloud network and a radio access network (RAN) and/or a core network for wireless telecommunications has rapidly increased. The RAN provides wireless connectivity to mobile computing devices by converting radio signals into data packets. The core network coordinates among various parts of the RAN and provides connectivity to a packet-based network (e.g., the Internet). Traditional wireless telecommunications deployed servers with hardware that was specialized to particular types of processing and was typically built with a capacity to accommodate an estimated peak load of the network traffic. Use of cloud network technology, particularly virtual server technologies, has enabled decoupling of at least some wireless data processing from specialized hardware onto general-purpose servers.

With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc. To meet these requirements, the RAN architecture has expanded. For instance, Multi-Access Edge Computing (MEC) brings applications from centralized datacenters to the network edge, closer to end users. MEC provides low latency, high bandwidth, and real-time access to RAN information.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

As discussed in more detail below, the present disclosure is directed to developing and enforcing flow policies (e.g., a set of data traffic rules) at the cell-site level to alleviate congestion in wireless networks. In particular, the disclosed technology determines congestion levels for the data communication sessions connected to a cell site. The disclosed technology further determines a congestion level associated with the cell site and enforces flow policies on individual data communication sessions based on the overall cell-site congestion level. A data communication session may correspond to a data connection between a cellular device and the cell site. The data connection may be based on Transmission Control Protocol (TCP), User Datagram Protocol (UDP), or other protocols.

In aspects, per cell-site congestion level determinations may be distributed to a traffic detection and enforcement function (TDEF) of a cellular gateway, which may act as a mediator (e.g., aggregator and/or translator) between a plurality of cell sites and a network. TDEF optimizes data delivery over data communication sessions connected to a congested cell site by detecting flows that are abnormally high (e.g., elephant flows) and are consuming disproportionately high amount of network resources. The disclosed technology applies rate limiting or shaping policies (e.g., flow policies) to these elephant flows in the congested cell site. A new rate limiting policy can be selected anytime the policies are evaluated to toggle flow through the cell site. By dynamically selecting the rate limiting policies enforced on individual data communication sessions at any given time, and thereby regulating (or shaping) the amount of traffic handled by congested cell sites, overall network performance can be improved.

Figure 1:
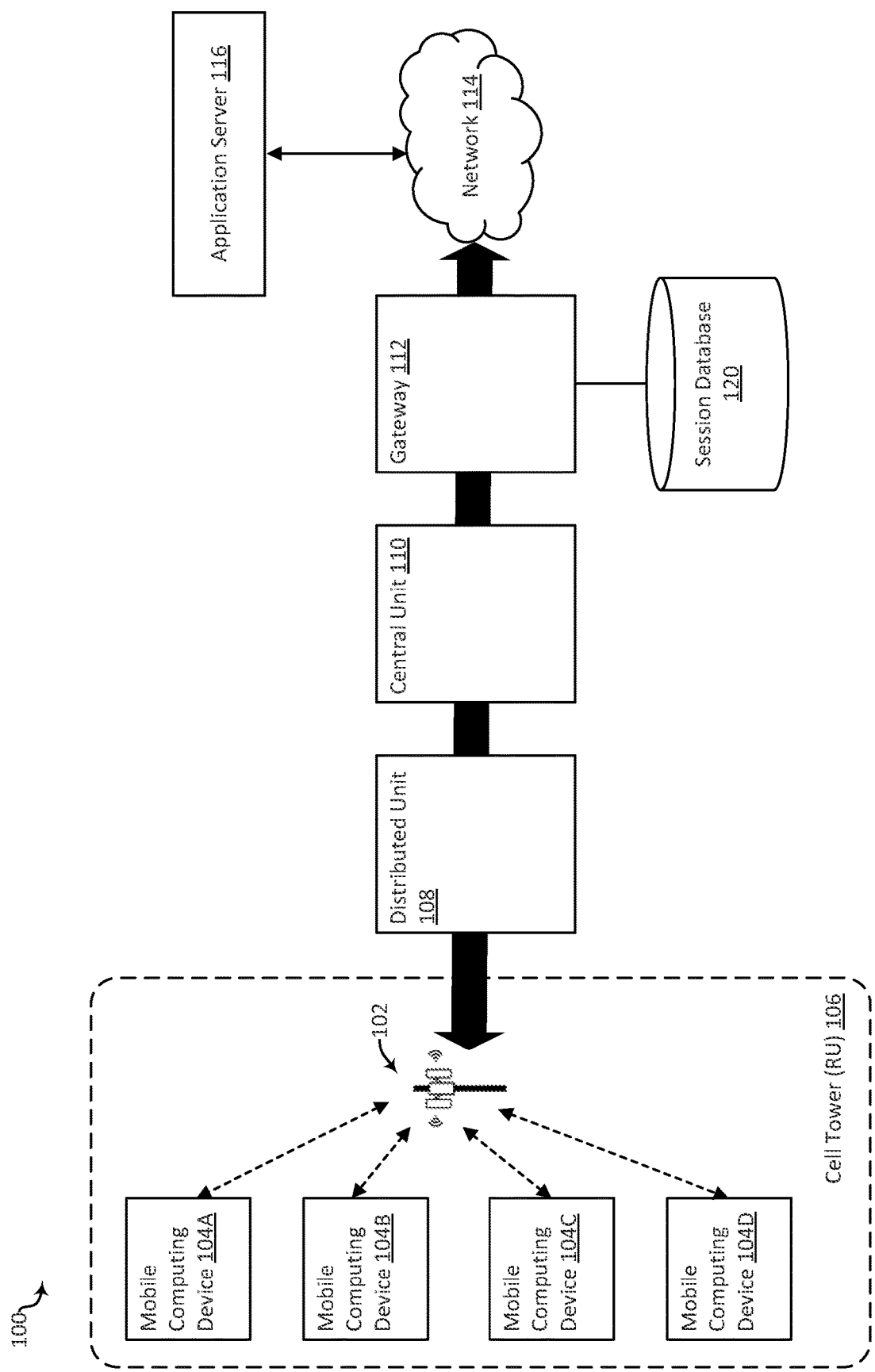
FIG. 1 illustrates an overview of an example system for controlling data traffic in wireless networks in accordance with aspects of the present disclosure.

FIG. 1 illustrates an overview of an example system for determining and enforcing a flow policy on data traffic in a wireless network in accordance with aspects of the present disclosure. The system 100 includes a cell tower 106 associated with a radio unit (RU) including a cell site 102. The system further includes a distributed unit (DU) 108, a central unit (CU) 110, a gateway 112, a network 114, and an application server 116. In aspects, the cell site 102 refers to the antenna equipment installed on cell tower 106 used to transmit and receive cellular signals. As should be appreciated, while in this example only one cell site 102 is shown at cell tower 106, in other examples, a plurality of cell sites 102 may be associated with cell tower 106. As noted above, the cell tower 106 is a physical structure positioned at a geographic location. Mobile computing devices 104A-104D, which are within geographic proximity to the cell tower 106, may connect to the cell site 102 to access network 114, for example, the Internet. A geographic area surrounding the cell tower 106 may define a cellular service area within which the mobile computing devices 104A-D may connect to the cell site 102. The geographic area may be based on a distance radio waves are able to travel for a mobile computing devices 104A-D to establish a data communication session with the cell site 102. Mobile computing devices 104A-D in geographic proximity to the cell site 102 may be within the geographic area served (or covered) by the cell site 102. In aspects, each of the mobile computing devices 104A-104D may establish a distinct wireless communication session with cell site 102.

The cell tower (RU) 106 may connect to a distributed unit (DU) 108. The distributed unit 108 is a part of radio access network (RAN) and may be associated with network switches and other computing hardware and software to process data in a series of operations associated with a physical layer and a data link layer of the Open System Interconnection (OSI) model. The distributed unit 108 connects to a central unit (CU) 110, which is also a part of the RAN. In aspects, a combination of distributed unit 108 and the central unit 110 may process partitions associated with layers one, and two, and at least a part of layer three of the OSI model. In particular, respective servers in the RAN include central processors (CPUs) and a variety of accelerators for processing data traffic between the mobile computing devices 104A-D and a gateway 112 to network 114 via cell site 102.

The gateway 112 serves as a mediator between a cellular telecommunication network and an external network (e.g., a network 114 or the Internet). The cellular telecommunication network may include the one or more mobile computing devices 104A-D, the cell tower 106, the RAN including the distributed unit 108 and a central unit 110, and a core network (not shown). In aspects, the gateway 112 authenticates data access requests from the one or more mobile computing devices 104A-D to the network 114 and to an application server 116.

In aspects, the gateway 112 establishes and takes down data communication sessions between mobile computing devices 104A-D and the application server 116. In establishing a data communication session, the gateway 112 may assign a maximum bandwidth for data traffic flowing through cell site 102 for the data communication session.

For example, the gateway 112 may assign a maximum bandwidth of 100 Mbits per second to a data communication session associated with a mobile computing device 104A, but may assign a maximum bandwidth of 20 Mbits per second to another data communication associated with a mobile computing device 104B. In aspects, the maximum bandwidth allocation may act to rate-limit traffic flow for a data communication session. In aspects, the gateway 112 may maintain a set of flow policies. Respective flow policies may each include a different maximum bandwidth allocation from among a range of maximum bandwidth allocations. The gateway 112 may select a flow policy from the set of flow policies upon establishing a data communication session.

The gateway 112 may store data mapping a cell site to the one or more mobile computing devices with which data communication sessions are established. For example, the mobile computing device 104A may be connected to cell site 102 to access cellular wireless network 114. In aspects, data received by gateway 112 from the mobile computing device 104A in establishing a data communication session may include information associated with the cell site 102.

The gateway 112 may store the data associated with data communication sessions in a session database 120. In aspects, session data is updated in the session database 120 as the gateway 112 establishes and takes down data communication sessions (e.g., Internet Protocol (IP) sessions). The session database 120 may further store flow policies for the data communication sessions.

In aspects, the gateway 112 may determine a level of congestion for each data communication session on a periodic basis (e.g., every second, every minute, every five minutes, etc.), where the level of congestion may correspond to an amount of data traffic (e.g., flow represented in Mbps) associated with each of the one or more mobile computing devices 104A-104D connected to cell site 102. When traffic flow associated with a mobile computing device 104A surpasses a predetermined bandwidth (or flow) threshold for a data communication session, the gateway 112 may tag the mobile computing device 104A as a heavy data bandwidth consumer (or a mobile computing device with an elephant flow). That is, when a data communication session has a higher flow rate, the data communication session utilizes a greater share of the available bandwidth vis-à-vis other data communication sessions. The higher the flow rate for a data communication session, the more disproportionate the consumption of bandwidth and the higher the congestion level attributable to that data communication session.

When an aggregate consumed bandwidth of the one or more mobile computing devices 104A-104D connected to cell site 102 surpasses a predetermined bandwidth threshold, the gateway 112 may select a flow policy from the set of flow policies to enforce on data communication sessions consuming a disproportionately high amount of the network bandwidth. The gateway 112 then enforces a maximum bandwidth allocation for the mobile computing device 104A, which is tagged as a heavy data bandwidth consumer.

In aspects, the congestion of cell site 102 may correspond to one of a plurality of severity levels. For example, the plurality of severity levels may include NONE, MILD, MODERATE, and SEVERE in the order of increasing levels of severity. Flow policies may be tailored to address respective severity levels based on different maximum network bandwidth allocations to be enforced on data communication sessions utilizing disproportionately high amounts of bandwidth. By periodically evaluating the congestion level of a cell site and dynamically updating flow policies based on the detected level, the system is able to dynamically respond to changes in cell site congestion in a network. That is, as cell site congestion fluctuates, different rate limiting policies may be applied to one or more data communication sessions that are consuming a disproportionately high amount of network bandwidth. Accordingly, the disclosed technology enables new mobile computing devices to establish data traffic sessions with a cell site even when the congestion at the cell site is severe.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
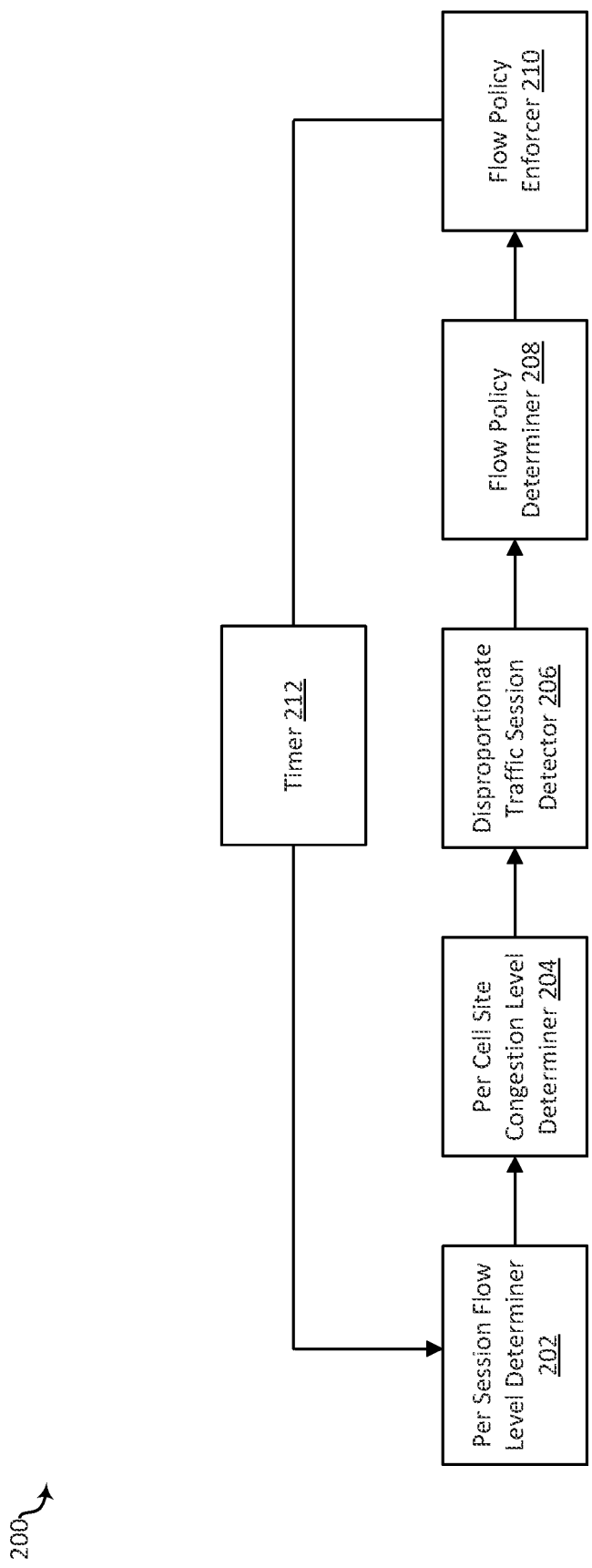
FIG. 2 illustrates an overview of an example system for determining and enforcing a data flow policy in accordance with aspects of the present disclosure.

FIG. 2 illustrates an overview of an example system for determining and enforcing a data flow policy in accordance with aspects of the present disclosure. System 200 includes a per session congestion level determiner 202, a per cell site congestion level determiner 204, a disproportionate traffic session detector 206, a flow policy determiner 208, a flow policy enforcer 210, and a timer 212. In an example, a gateway (e.g., the gateway 112 as shown in FIG. 1) may execute the system 200, but the disclosure is not so limited. That is, any computing device capable of making the determinations and enforcing the policies described above may execute system 200.

The per session congestion level determiner 202 may determine a level of congestion associated with respective data communication sessions between the one or more mobile communication devices and the cell site. Levels of congestions may range from NONE indicating no congestion, MILD, MODERATE, and SEVERE in the order of increasing levels of traffic bandwidth consumed by the respective data communication sessions.

For example, the per session congestion level determiner 202 may detect a data traffic flow associated with a data communication session of the mobile computing device 104A that is higher than a predetermined flow threshold associated with the SEVERE level. That is, when a data communication session has a higher flow rate, the data communication session utilizes a greater share of the available bandwidth vis-à-vis other data communication sessions. The higher the flow rate for a data communication session, the more disproportionate the consumption of bandwidth and the higher the congestion level attributable to that data communication session. In aspects, the per session congestion level determiner 202 may mark or tag the data communication session and an associated mobile computing device as a heavy bandwidth consumer or an "elephant flow."

The per cell site congestion level determiner 204 detects an aggregate traffic flow for a cell site based on the individual traffic flow determined for each data communication session. For example, the per cell site congestion level determiner 204 may determine a level of congestion for the cell site 102 (as shown in FIG. 1) by aggregating respective data traffic flows for respective data communication sessions associated with the mobile computing devices 104A-D connected to the cell site 102 as shown in FIG. 1.

In aspects, the per cell site congestion level determiner 204 may assign a congestion level to a cell site based on the aggregate traffic flow associated with the data communication sessions through the cell site 102 as shown in FIG. 1. In an example, the plurality of congestion levels for a cell site may include NONE indicating no congestion, MILD, MODERATE, and SEVERE in the order of increasing levels of traffic flow. For example, the per cell site congestion level determiner 204 may determine that a congestion level of the cell site 102 may be SEVERE when the aggregate value of per session bandwidths in the cell site 102 surpasses a predetermined threshold of bandwidth consumption associated with the SEVERE level. At a SEVERE level of per cell site congestion, available bandwidth may be insufficient for the data communication sessions currently connected to the cell site, potentially causing communication disruptions and/or dropped sessions. Moreover, new mobile computing devices coming into proximity of the cell site 102 may not be able to establish new connections, causing further disruptions since the network may be unable to sufficiently handle mobile devices entering the geographic area associated with the cell site.

In an example, the per cell site congestion level determiner 204 determines a congestion level based on a weighted sum of a number of subscribers (e.g., data communication sessions) with varying levels of per session congestion levels in the cell site. In aspects, weights associated with more severe levels of per session congestion may be higher than weights associated with less severe levels. In aspects, a subscriber congestion is detected using data performance information from its TCP and UDP data connections. The cell site congestion levels may be calculated based on the ratios of subscribers in different congestion levels.

In some cases, when the per cell site congestion is greater than NONE (i.e., there is at least some congestion), the disproportionate traffic session detector 206 may detect whether there are one or more data communication sessions marked as heavy bandwidth consumers in the cell site. In other cases, when the per cell site congestion is MODERATE and above, or SEVERE and above, for instance, the disproportionate traffic session detector 206 may detect whether there are one or more data communication sessions marked as heavy bandwidth consumers in the cell site.

The flow policy determiner 208 may determine flow policies associated with respective data communication sessions established with the cell site. In aspects, a flow policy may be based on a level of per session congestion and may include a corresponding maximum bandwidth allocation to enforce rate limitations on data communication sessions at different congestion levels. The level of per session congestion may range from NONE, MILD, MODERATE, and SEVERE, in an increasing order of severity of a bandwidth consumption. In some cases, when a cell site congestion level is SEVERE, a flow policy may be enforced against data communication sessions at a MODERATE or SEVERE congestion levels, for example. In other aspects, a flow policy may only be enforced against data communication sessions at a SEVERE congestion level. The flow policies may be distinct for data communication sessions at different congestion levels. In this way, by enforcing flow policies against data communication sessions at MODERATE or SEVERE congestion levels, some of the overall bandwidth available to the cell site may be freed for new connections or spikes associated with current connections. As should be appreciated, flow policies may be designed and enforced in any suitable manner across or among data communication sessions to reduce cell site congestion.

The flow policy enforcer 210 may enforce flow policies upon respective data communication sessions marked as heavy bandwidth consumers (e.g., having higher congestion levels) in a cell site. In particular, the flow policy enforcer 210 may enforce maximum bandwidth allocations for the respective data communication sessions according to flow policies as determined by the flow policy determiner 208. By enforcing flow policies on some data communication sessions, the cell site may free bandwidth of a fixed amount of network bandwidth available to the cell site. In this way, by enforcing respective flow policies on disproportionately high bandwidth consumers, the cell site is able to maintain current connections with mobile computing devices while also freeing network bandwidth for new connections. Thus, even when the cell site is congested, the cell site may handle new mobile computing device requests to establish new data communication sessions based on the freed network bandwidth.

The timer 212 may count a predetermined time period or wait time. After the predetermined wait time, the processing may repeat and pass to the per session congestion level determiner 202. Use of the timer 212 enables periodically updating congestion levels of the respective data communication sessions, and new data communication sessions, in the cell site, as well as updating the aggregate cell site congestion level. The periodically updated congestion levels may cause further updates to the flow policies selected and enforced upon the respective data communication sessions. By dynamically updating congestion levels for both data communication sessions and the cell site, system 200 enables a dynamic, real-time response to fluctuations in data traffic. For example, by dynamically enforcing rate-limiting flow policies and traffic shaping, with a bias against data communication sessions having disproportionally high bandwidth consumption, the system 200 is able to maintain available bandwidth for new connections even during periods of high congestion.

FIGS. 3A-E illustrate example data structures for storing data associated with data communication sessions, per session and per cell site congestion levels, and flow policies in accordance with aspects of the present disclosure. In aspects, a session database (e.g., the session database 120 as shown in FIG. 1) stores the data structures. FIG. 3A illustrates an example flow data table. The flow data table 300A stores attributes of data communication sessions. Flow data 302 includes session identifier 304, connection identifier 306, peak throughput 308, time duration 310, average throughput 312, congestion level 314, and cell site identifier 316. For example, a data communication session has a session identifier 304 of "001," a connection identifier 306 of "002," a peak throughput 308 of 95 Megabits per second (Mbps), a time duration 310 of 10 seconds at the peak throughput 308, an average throughput 312 of 32 Mbps, a congestion level 314 marked as SEVERE, and a cell site identifier 316 of "101". In aspects, a per session congestion level determiner (e.g., the per session congestion level determiner 202 as shown in FIG. 2) may periodically update the flow data table 300A.

FIG. 3B illustrates an example of definitions for congestion levels for a cell site in accordance with aspects of the present disclosure. The congestion level definition table 300B stores definitions for a plurality of congestion levels associated with a cell site. In aspects, the congestion level definition 320 includes a severity level 322, weight 326 for aggregating sessions, and a minimum congestion percent 328 for a cell site. In aspects, the severity level 322 may include NONE, MILD, MODERATE, and SEVERE to indicate a severity level of congestion associated with a cell site. The weight 326 indicates a weight value used to compute a weighted aggregate of sessions (e.g., subscribers) in a cell site. In an example, more severe levels of congestion correspond to higher weight values used for computing a weighted aggregate of the sessions in the respective levels. The minimum congestion percent 328 for a cell site indicates a minimum congestion percent for a cell site to qualify as having a particular congestion level as detailed below.

Congestion percent may be defined as a ratio of a weighted aggregate of sessions (e.g., subscribers) in a cell site over the maximum weighted value when a severity level is SEVERE). "Congestion Percent"="Total Weighted Subscribers Connected in a Cell Site"/"The Maximum Weights of the Subscribers in the Cell Site."

For example, a congestion policy of severity level NONE corresponds to the weight 326 of zero, and the minimum congestion percent 328 value of zero. A congestion policy of severity level MILD corresponds to the weight 326 of 1, and the minimum congestion percent 328 value of 20. A congestion policy of severity level MODERATE corresponds to the weight 326 of 2, and the minimum congestion percent 328 of 30. A congestion policy of severity level SEVERE corresponds to the weight 326 of 4, and the minimum congestion percent value 328 of 50. For example, a congestion level of a cell site is MILD when its congestion percent value of 28 is between the minimum congestion percent value for a cell site with a MILD congestion level 20 and the value associated with a MODERATE congestion level 30 for the cell site.

FIG. 3C illustrates an example of determining a congestion level associated with a cell site in accordance with aspects of the present disclosure. The disclosed technology determines a cell congestion level of a cell site after determining congestion levels associated with respective data communication sessions. The example 300C indicates an example of determining a congestion level 330 based on the following computation:

A number of subscribers may be equivalent to a number of data communication sessions where a subscriber corresponds to one data communication session.

For example, a cell site accommodates 10,000 subscribers (e.g., 10,000 mobile computing devices associated with a data communication session). Of the 10,000 subscribers, 1,000 subscribers are determined as under the SEVERE level of congestion, 2,000 subscribers are under MODERATE level, 3,000 subscribers are in MILD level in the cell site.

A total weighted number of subscribers in the cell site may be computed as follows:

1,000 (SEVERE)×4+2,000 (MODERATE)×2+3,000 (MILD)×1=11,000.

The maximum weighted value in the cell site indicates when all the subscribers are at the SEVERE level: 10,000 (a total number of subscribers in the cell site)×4 (weight of SEVERE)=40,000.

A congestion percent of the cell site may be computed as: 11,000/40,000=28%.

Since the congestion percent of the cell site at 28% falls between the MODERATE level (30%) and the MILD level (20%), the current congestion level of the cell site is MILD level. To summarize, the cell congestion level in percent is based on a ratio between a weighted aggregate of numbers of the data sessions with distinct congestion levels ranging from a normal level to a severe level, and a hypothetical maximum weighted value (e.g., a weighted aggregate) of a number of all data sessions at the severe level in the cell site.

In aspects, the per cell site congestion level determiner (e.g., the per cell site congestion level determiner 204 as shown in FIG. 2) determines and periodically updates the current congestion level of the cell site.

FIG. 3D illustrates an example per cell site congestion data in accordance with aspects of the present disclosure. The per cell site congestion level data 300D includes a cell site congestion 350, which includes cell site identifier 352 and sessions at congestion levels in a cell site 353 For example, a cell site with identifier "099" may include 399 subscribers (or data communication sessions) at the congestion level NONE, 95 subscribers at the congestion level MILD, 1211 subscribers at the congestion level MODERATE, and 1968 subscribers at the congestion level SEVERE. In aspects, the per session congestion level determiner (e.g., the per cell site congestion level determiner 204) stores and updates congestion level data associated with cell sites. The cell site is determined as having a cell site congestion level 358 at SEVERE level.

FIG. 3E illustrates an example flow policy definition 364 according to aspects of the present disclosure. The data 300E includes flow policy definition 364 including distinct types of severity levels of session 366 and the maximum throughput 368 in Mbps. In an example, a severity level NONE of a session corresponds to a maximum throughput of 500 Mbps, a MILD level of a session corresponds to 250 Mbps, a MODERATE level of a session corresponds to 100 Mbps, and a SEVERE level of a session corresponds to 50 Mbps.

In aspects, the disclosed technology enforces a flow policy associated with SEVERE sessions at 50 Mbps to data connection sessions with a severity level SEVERE when a cell site is its congestion level at the SEVERE level. Data connection sessions at other severity level may be subject to a flow policy associated with the severity level. Using the cell site congestions 350 shown in FIG. 3D as an example, 1968 lines at SEVERE level in the cell site 099 that is at SEVERE level are enforced with the maximum throughput of 50 Mbps.

Additionally or alternatively, the disclosed technology determines a severity level of a cell site based on a weighted aggregate of sessions (e.g., subscribers) of distinct congestion levels, and enforces a maximum throughput to data connection sessions in the cell site based on the determined severity level of the cell site. For example, the disclosed technology may enforce 50 Mbps to all sessions in a cell site when the cell site is at a severity level SEVERE.

In aspects, the present disclosure enforces flow policies upon at least data connection sessions with disproportionately high data bandwidth consumption when the cell site experiences a high congestion level. Through enforcing the policies with the bias against the sessions with disproportionately high consumption, the disclosed technology leaves at least some part of available network bandwidth resources available for new data connection sessions to establish communication, even when the cell congestion level for the cell site is high.

FIG. 3F illustrates an example table mapping cell site to associated congestion levels according to aspects of the present disclosure. Data 300F includes cell sites at congestion levels 370, which includes cell site identifier 372, chassis 374, and a number of sessions at congestion levels 376 for the respective cell sites. The number of sessions at congestions levels indicates a number of subscribers (or data communication sessions) across different congestion levels in the cell site. The cell site identifier 372 may be associated with a chassis 374, which corresponds to hardware in the gateway connecting to a cell site.

For example, a cell site with the cell site identifier 372 of "001" corresponds to 67 of the chassis 374, including 100 subscribers (or data communication sessions) at the level NONE, 10 subscribers at the level MILD, zero subscriber at the level MODERATE, and zero subscriber at the level SEVERE. A cell site congestion level 386 for the cell site "001" is MILD. A cell site with the cell site identifier 372 of "060" corresponds to 67 of the chassis 374, including 200 subscribers (or data communication sessions) at the level NONE, zero subscriber at the level MILD, zero subscriber at the level MODERATE, and zero subscriber at the level SEVERE. The cell site congestion level 386 for the cell site "060" is NONE. A cell site with the cell site identifier 372 of "099" corresponds to 67 of the chassis 374, including 399 subscribers (or data communication sessions) at the level NONE, 95 subscribers at the level MILD, 1211 subscribers at the level MODERATE, and 1968 subscribers at the level SEVERE. The cell site congestion level 386 for the cell site "060" is NONE.

FIGS. 4A-B illustrates examples of determining and enforcing flow policies in accordance with aspects of the present disclosure. FIG. 4A illustrates an example of cell site conditions of a cell site at an initial time. FIG. 4B illustrates the example of cell site conditions of the cell site at a subsequent time after the initial time based on a periodic time cycle. In aspects, the time cycle may be a predetermined wait period before initiating a next cycle of determining congestion levels associated with data communication sessions and cell sites.

In aspects, data 400A indicates cell site conditions 402A at the initial time. Cell site congestion level 404A indicates a level SEVERE for a cell site with an identifier "099". The cell site congestion level 404A further includes per subscriber (or per data communication session) levels of congestion for respective subscribers. For example, the cell site 099 includes a data communication session with a session identifier 406A of "001" and a connection identifier 408A of "001" at a session congestion level 410A of SEVERE, with a flow policy 412A being enforced (YES). The cell site 099 further includes a data communication session with the session identifier 406A of "002" and a connection identifier 408A of "001" at a session congestion level 410A of SEVERE, with a flow policy 412A being enforced (YES).

In this example, a new subscriber may establish a data communication session in the cell site 099 when the cell site 099 is at the congestion level SEVERE. The new subscriber may have the session identifier 406A of "003," the connection identifier 408A of "001," and the session congestion level 410A of NONE, without a flow policy being enforced (NO 420A). Since the session 003 is a new session, the per session congestion level determiner 202 may have not yet detected a network bandwidth consumed by the new session and/or determined the congestion level for the new session.

FIG. 4B illustrates flow policies being enforced upon the respective sessions in the cell site after one time cycle lapses. Data 400B includes cell site conditions 402B after one time cycle. The congestion level of the cell site 099 remains SEVERE. In contrast to the data 400A at the initial time, a flow policy 412B is being enforced (YES 420B) against the session with the session identifier "003." Accordingly, the session with the session identifier 003 is subject to the maximum throughput associated with a flow policy of level NONE (e.g., at the maximum throughput of 500 Mbps as defined in the congestion level definition 320 as shown in FIG. 3B).

As detailed above, the disclosed technology enforces flow policies associated with respective subscribers (or data communication sessions) in a cell site according to a congestion level of the cell site. The periodic determination on congestion levels and enforcement of flow policies for the respective sessions and cell sites enables the present disclosure to dynamically adapt to the latest state of congestions being experienced at the respective cell sites.

FIG. 5 illustrates an example of a method for determining and updating flow policies of data communication sessions at cell sites in accordance with aspects of the present disclosure. A general order of the operations for the method 500 is shown in FIG. 5. Generally, the method 500 begins with start operation 502. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-B, 6, and 7A-B.

Following start operation 502, the method 500 begins with determine operation 504, in which a consumption level of a first data communication session associated with a first device in a cell site is determined. In aspects, the first device may correspond to a mobile computing device that communicates wirelessly to a cell site (e.g., the mobile computing device 104A connecting to the cell site 102) and further to an application server through a gateway, over an external network. In aspects, the consumption level corresponds to a per session congestion level based on a network bandwidth consumed by the first device.

At determination operation 506, a consumption level of a second data communication session associated with a second device in the cell site is determined. In aspects, the second device may correspond to another mobile computing device that communicates wirelessly to a cell site (e.g., the mobile computing device 104B connecting to the cell site 102). In aspects, the consumption level corresponds to a per session congestion level based on a network bandwidth consumed by the second device.

At aggregate operation 508, the consumption levels (e.g., network bandwidths) of the first and second devices in the cell site may be aggregated. In some examples, the consumption levels may be aggregated using weights applied at respective congestion levels, as described with respect to FIG. 3B.

At determine operation 510, a cell site congestion level may be determined. In aspects, determining a congestion level for the cell site may be based on a number of subscribers (or data communication sessions) at respective congestion levels, as detailed in FIG. 3C.

At identify operation 512, the first data communication session is identified as having a disproportionately high data traffic flow. The identify operation 512 may be based on a combination including the cell congestion level and a data traffic flow associated with the first data connection.

At dynamically update operation 514, flow policies (e.g., a data traffic rule) to enforce against the first data connection session is dynamically updated based on the cell congestion level.

At enforce operation 516, flow policies may be selected and enforced upon respective data communication sessions in the cell site. In aspects, the enforce operation 516 may enforce distinct flow policies with distinct maximum network bandwidths on respective data communication sessions. The distinct flow policies for sessions may be based on the congestion level definitions as detailed above (e.g., the congestion level definition 320 as shown in FIG. 3B). For example, a device with a severity level SEVERE may be allowed to consume a network bandwidth up to 50 Mbps while another device with a severity level NONE may be allowed to consume a network bandwidth up to 500 Mbps. In aspects, the enforce operation 516 may restrict the maximum throughputs associated data connection sessions at SEVERE level but not upon other data connection sessions at less severe levels when the cell site is at SEVERE level.

In another example, the respective data communication sessions (e.g., associated with 10,000 subscribers) may be subject to the maximum bandwidth as defined by a congestion level associated with the cell site. In the example, the maximum network bandwidth at 100 Mbps may be enforced across all data communication sessions when the congestion severity level of the cell site is MILD, as shown in FIG. 3C.

At cause operation 518, a more severe reduction in network bandwidth consumed by data communication sessions with more severe congestion levels may be enforced in the cell site according to a combination of flow policies designed for different congestion levels of the cell site.

A wait operation 520, a predetermined time period (e.g., a minute) may lapse before repeating determinations of per session congestion levels and per cell site congestion levels and enforcing corresponding flow policies. In aspects, the method may return to the determine operation 504 following wait operation 520.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes a per session consumption level determiner 630, per cell site consumption level determiner 632, data flow reduction policy determiner 634, and data flow reduction policy enforcer for the cell site 636 as described in more details in FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., the mobile computing device 104A as shown in the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., a distributed unit 108, a central unit 110, a gateway 122, and an application server 116, as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for causing reduction in data traffic congestion at a cell site according to at least the examples provided in the sections below. The method comprises determining a first congestion level of a first data connection associated with a first computing device wirelessly connected to a cell site; determining a second congestion level of a second data connection associated with a second computing device wirelessly connected to the cell site; determining, based on aggregating the first congestion level and the second congestion level, a cell congestion level associated with the cell site; identifying, based on a combination including the cell congestion level and a data traffic flow associated with the first data connection, the first data connection has disproportionately high data traffic flow; dynamically updating, based on the cell congestion level, a data traffic rule to enforce against the first data connection having the disproportionately high data traffic flow; and based on enforcing the updated data traffic rule, causing reduction in data congestion in the cell site. The first congestion level includes one of a normal level, a mild level, or a severe level, and wherein a first maximum network throughput associated with the severe level is less than a second maximum network throughput associated with the normal level. The first congestion level is based at least on a peak throughput, a time duration of the peak throughput, and an average throughput of data traffic in the first data connection. The first congestion level and the second congestion level are distinct, and wherein a first maximum network throughput associated with the first data connection having the disproportionately high data traffic flow is less than a second maximum network bandwidth associated with the second data connection. The cell site is wirelessly connected with one or more computing devices. The cell site is associated with one or more data connections. The cell congestion level is based on a weighted sum of a number of data connections at each respective congestion level in the cell site. The cell congestion level is based on a ratio between a weighted aggregate of data connections with distinct congestion levels ranging from a normal level to a severe level and a hypothetical weighted aggregate of all data connections being at the severe level.

Another aspect of the technology relates to a system causing reduction in data congestion at a cell site. The system comprises at least one processor; and memory storing instructions that, when executed by the at least one processor, cause the system to execute a method comprising: determining a first congestion level of a first data connection associated with a first computing device wirelessly connected to a cell site; determining a second congestion level of a second data connection associated with a second computing device wirelessly connected to the cell site; determining, based on aggregating the first congestion level and the second congestion level using weights associated with the first congestion level and the second congestion level, a cell congestion level associated with the cell site; identifying, based on a combination including the cell congestion level and a data traffic flow associated with the first data connection, the first data connection has disproportionately high data traffic flow; dynamically updating, based on the cell congestion level, a data traffic rule to enforce against the first data connection having the disproportionately high data traffic flow; and based on enforcing the updated data traffic rule, causing reduction in data congestion in the cell site. The first congestion level includes one of a normal level, a mild level, or a severe level, and wherein a first maximum network throughput associated with the severe level is less than a second maximum network throughput associated with the normal level. The first congestion level is based at least on a peak throughput, a time duration of the peak throughput, and an average throughput of data traffic in the first data connection. The first congestion level and the second congestion level are distinct, and wherein a first maximum network throughput associated with the first data connection having the disproportionately high data traffic flow is less than a second maximum network bandwidth associated with the second data connection. The cell site is wirelessly connected with one or more computing devices. The cell site is associated with one or more data connections. The cell congestion level is based on a weighted sum of a number of data connections at each respective congestion level in the cell site. The cell congestion level is based on a ratio between a weighted aggregate of data connections with distinct congestion levels ranging from a normal level to a severe level and a hypothetical weighted aggregate of all data connections being at the severe level.

In still another aspects, the technology relates to a method for alleviating data congestion at a cell site. The method comprises determining, based on a combination of a number of data connections and weights corresponding to congestion levels associated with respective data connections in a cell site, a cell congestion level associated with the cell site; identifying, based on the cell congestion level, a flow policy of the cell site, wherein the flow policy includes a data traffic rule enforced upon at least in part of the respective data connections in the cell site, and wherein the data traffic rule includes enforcing a maximum throughput to data traffic; enforcing the flow policy upon one or more data connections of the respective data connections in the cell site; dynamically updating, based on the cell congestion level, the flow policy of the cell site; and causing reduction in data congestion at the cell site. The cell congestion level includes one of a normal level, a mild level, or a severe level. The method further comprises, when the cell congestion level of the cell site includes the severe level, identify a set of data connections including a data connection with a congestion level of at least a severe level; and enforce the flow policy of the cell site, wherein the flow policy of the cell site includes enforcing a predetermined maximum throughput to data traffic associated with each of the set of data connections. The method further comprises creating a new data connection in the cell site; enforcing a first maximum throughput upon data traffic associated with the new data connection; and enforcing, upon the dynamically updating the flow policy of the cell site, the predetermined maximum throughput upon data traffic associated with the new data connection, wherein the predetermined maximum throughput is less than the first maximum throughput.

Any of the one or more above aspects in combination with any other of the one or more aspect. Any of the one or more aspects as described herein.

What is claimed is:

1. A computer-implemented method for causing reduction in data congestion at a cell site, the method comprising:
   determining a first congestion level of a first data connection associated with a first computing device wirelessly connected to a cell site, wherein the first congestion level is based on a first data traffic flow of the first data connection, and the first congestion level corresponds to a first weight;

determining a second congestion level of a second data connection associated with a second computing device wirelessly connected to the cell site, wherein the second congestion level is based on a second data traffic flow of the second data connection, and the second congestion level corresponds to a second weight;

determining, based on aggregating a first number of data connections with the first congestion level, the first weight, a second number of data connections with the second congestion level, and the second weight, a cell congestion level of the cell site;

identifying, based on a combination including the cell congestion level and the first data traffic flow of the first data connection, the first data connection as having disproportionately high data traffic flow;

dynamically updating, based on the cell congestion level, a data traffic rule to enforce against the first data connection identified as having the disproportionately high data traffic flow; and based on enforcing the updated data traffic rule, causing reduction in data congestion in the cell site.

2. The computer-implemented method of claim 1, wherein the first congestion level includes one of:
a normal level,
a mild level, or
a severe level, and wherein a first maximum network throughput of the severe level is less than a second maximum network throughput of the normal level.

3. The computer-implemented method of claim 1, wherein the first congestion level is based at least on a peak throughput, a time duration of the peak throughput, and an average throughput of data traffic in the first data connection.

4. The computer-implemented method of claim 1, wherein the first congestion level and the second congestion level are distinct, and wherein a first maximum network throughput of the first data connection having the disproportionately high data traffic flow is less than a second maximum network bandwidth of the second data connection.

5. The computer-implemented method of claim 1, wherein the cell site is wirelessly connected with one or more computing devices.

6. The computer-implemented method of claim 1, wherein the cell site comprises one or more data connections.

7. The computer-implemented method of claim 1, wherein the cell congestion level is based on a weighted sum of a number of data connections at each respective congestion level in the cell site.

8. The computer-implemented method of claim 1, wherein the cell congestion level is based on a ratio between a weighted aggregate of data connections with distinct congestion levels ranging from a normal level to a severe level and a hypothetical weighted aggregate of all data connections being at the severe level.

9. A system for causing reduction in data congestion at a cell site, the system comprising:
at least one processor; and
memory storing instructions that, when executed by the at least one processor, cause the system to execute a method comprising:
determining a first congestion level of a first data connection of a first computing device wirelessly connected to a cell site, wherein the first congestion level is based on a first data traffic flow of the first data connection, and the first congestion level corresponds to a first weight;

determining a second congestion level of a second data connection of a second computing device wirelessly connected to the cell site, wherein the second congestion level is based on a second data traffic flow of the second data connection, and the second congestion level corresponds to a second weight;

determining, based on aggregating a first number of data connections with the first congestion level, the first weight, a second number of data connections with the second congestion level, and the second weight, a cell congestion level of the cell site;

identifying, based on a combination including the cell congestion level and the first data traffic flow of the first data connection, the first data connection as having disproportionately high data traffic flow;

dynamically updating, based on the cell congestion level, a data traffic rule to enforce against the first data connection identified as having the disproportionately high data traffic flow; and based on enforcing the updated data traffic rule, causing reduction in data congestion in the cell site.

10. The system of claim 9, wherein the first congestion level includes one of:
a normal level,
a mild level, or
a severe level, and wherein a first maximum network throughput of the severe level is less than a second maximum network throughput of the normal level.

11. The system of claim 9, wherein the first congestion level is based at least on a peak throughput, a time duration of the peak throughput, and an average throughput of data traffic in the first data connection.

12. The system of claim 9, wherein the first congestion level and the second congestion level are distinct, and wherein a first maximum network throughput of the first data connection having the disproportionately high data traffic flow is less than a second maximum network bandwidth of the second data connection.

13. The system of claim 9, wherein the cell site is wirelessly connected with one or more computing devices.

14. The system of claim 9, wherein the cell site comprises one or more data connections.

15. The system of claim 9, wherein the cell congestion level is based on a weighted sum of a number of data connections at each respective congestion level in the cell site.

16. The system of claim 9, wherein the cell congestion level is based on a ratio between a weighted aggregate of data connections with distinct congestion levels ranging from a normal level to a severe level and a hypothetical weighted aggregate of all data connections being at the severe level.

17. A method for alleviating data congestion at a cell site, the method comprising:
determining, based on aggregating a number of data connections and first and second weights corresponding to respective congestion levels of respective first and second data connections in a cell site, a cell congestion level of the cell site, wherein the respective congestion levels are based on first and second data traffic flow of the respective first and second data connections;

identifying, based on the cell congestion level, a flow policy of the cell site, wherein the flow policy includes a data traffic rule enforced upon at least in part of the respective first and second data connections in the cell site, and wherein the data traffic rule comprises enforcing a maximum throughput to data traffic;

enforcing the flow policy upon one or more data connections of the respective first and second data connections in the cell site;

dynamically updating, based on the cell congestion level, the flow policy of the cell site; and causing reduction in data congestion at the cell site.

18. The method of claim 17, wherein the cell congestion level includes one of:
a normal level,
a mild level, or
a severe level.

19. The method of claim 18, the method further comprising:
when the cell congestion level of the cell site includes the severe level, identify a set of data connections including a data connection with a congestion level of at least a severe level; and
enforce the flow policy of the cell site, wherein the flow policy of the cell site includes enforcing a predetermined maximum throughput to data traffic of each of the set of data connections.

20. The method of claim 19, the method further comprising:
creating a new data connection in the cell site;
enforcing a first maximum throughput upon data traffic of the new data connection; and
enforcing, upon the dynamically updating the flow policy of the cell site, the predetermined maximum throughput upon data traffic of the new data connection, wherein the predetermined maximum throughput is less than the first maximum throughput.

* * * * *